Patented Feb. 3, 1931

1,790,915

UNITED STATES PATENT OFFICE

IVAN GUBELMANN AND HENRY J. WEILAND, OF SOUTH MILWAUKEE, WISCONSIN, ASSIGNORS, BY MESNE ASSIGNMENTS, TO NEWPORT CHEMICAL CORPORATION, A CORPORATION OF DELAWARE

PROCESS OF PREPARING HYDROXYANTHRAQUINONES

No Drawing. Application filed August 25, 1927. Serial No. 215,524.

This invention relates to a process for the preparation of hydroxyanthraquinones and more particularly to the preparation of quinizarine, 3-chloroquinizarine, and the like.

Quinizarine has heretofore generally been prepared from para chloro phenol, or its mono or disulpho derivatives, by condensation with phthalic anhydride in the presence of concentrated sulphuric acid and boric acid. Methods for the production of hydroxyanthraquinones starting from ortho chloro phenol or its derivatives have also been used. In the copending application of Ivan Gubelmann entitled "Process of preparing of 2- (or 3-) chloroquinizarine," Serial No. 66,426, filed October 31, 1925, is described a method for the preparation of 3-chloroquinizarine starting from 3, 4-dichloro phenol.

It is an object of the present invention to provide an improved method for preparing hydroxyanthraquinones and more especially quinizarine and 3-chloroquinizarine starting from a para chloro aniline and diazotizing, or from p-chloro-diazo-benzene, condensing with phthalic anhydride and hydrolyzing.

Other and further important objects of this invention will be apparent from the disclosures in the specification and the appended claims.

We have now discovered that if instead of using a phenol as the starting material for the preparation of hydroxyanthraquinones, a diazo compound is used, equally good results can be obtained at a lower cost of manufacture. This is in general due to the fact that the diazo compounds, such as para chloro diazo benzene, which is prepared from para chloro anilene, is a cheaper raw material than para chloro phenol, the latter being generally obtained by the chlorination of phenol, which yields isomers and by-products difficult and costly to separate. On the other hand, para chloro aniline is a product easily made in practically a pure form by the reduction of para nitro chloro benzene.

The ease with which the reaction to form hydroxyanthraquinones starting from para chloro anilene and diazotizing or from para chloro diazo benzene, may be carried out is the more unexpected, especially the decomposition of the diazo compound, since the decomposition and condensation are carried out in practically an anhydrous solvent, namely 96 to 100% sulphuric acid. One explanation is that sufficient water (one mole) is released during the ring closing step to furnish sufficient (OH) radicals for the replacement of the diazo group with an (OH) group. This explanation, however, is merely conjectural inasmuch as the actual order of the reactions taking place is practically impossible to prove. In any event, good yields of the hydroxyanthraquinones are obtained by the reaction between the diazo body and phthalic anhydride in a concentrated sulphuric acid solution in the presence of boric acid.

Without limiting our invention to any porticular procedure, the following examples in which parts by weight are given will serve to illustrate the preferred embodiments of our invention:

*Example 1.*—Quinizarine.

To 120 parts of water are added 147 parts of 66° Bé. sulphuric acid. The solution is cooled to 10° C. and there are alternately and progressively charged 92 parts of finely powdered para chloro aniline and 52 parts of sodium nitrite. The resulting solution is then added to 200 parts of sulphuric acid monohydrate preheated to 200° C. and while adding, there is also added a mixture consisting of 120 parts of boric acid and 320 parts of phthalic anhydride. At the same time and in proportion, there are added to the monohydrate solution 1,800 parts of 25% oleum. A temperature of about 200° C. is maintained in the reaction mass while making the above additions, requiring about one hour. The reaction mass is then held for 4 hours at 200° C. after the final additions are made. The mass is then cooled to 150° C. and poured into 36,000 parts of water. The resulting precipitate is filtered off and washed on the filter until practically free of acid and dried at 100° C. in vacuo. The product, quinizarine, can be used directly for the preparation of valuable dyestuffs.

*Example 2.*—3-chloroquinizarine.

65 parts of 3-4 dichloraniline sulphate are heated with 110 parts of sulphuric acid monohydrate to 50 to 75° C. This mixture is cooled to 25° C. and pasted. The paste is then added alternately with 23 parts of sodium nitrate to 58 parts of water, keeping the temperature around 10° C. More nitrite is added if necessary to complete the diazotization. The diazo solution is then added to 100 parts of sulphuric acid monohydrate previously heated to 200° C. simultaneously with 55 parts of boric acid, 150 parts of phthalic anhydride, and 1,000 parts of 25% oleum. The entire mixture is completed within about one hour, a temperature of about 200° C. being maintained during this period. The reaction mass is then held at 200° C. for an additional 4 hours, after which the mass is cooled to 150° C. and poured into 20,000 parts of cold water. The resulting precipitate is filtered off, washed free of acid, and dried at 100° C. in vacuo. The dry product, 3-chloroquinizarine, is sufficiently pure for use in the subsequent preparation of dyestuffs.

It is apparent that numerous details of the process may be varied through a wide range: for instance, the diazo compound may be decomposed in a weaker acid solution and the solution thereafter fortified by the use of oleum, followed by the addition of phthalic anhydride and boric acid; the reaction may be hastened by elevating the temperature or retarded by lowering the temperature; or other proportions of the reacting materials may be used with equal success. The important feature of our invention resides in the preparation of this class of compounds from diazo compounds without the isolation of any intermediate compounds, thus bringing about the several reactions necessary to prepare the ultimate product in a single reaction mass.

In general our invention contemplates the preparation of hydroxyanthraquinones of the general formula:

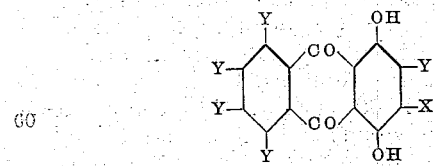

wherein X represents a hydrogen or a halogen atom and Y represents a univalent group such as hydrogen, halogen or alkyl.

We claim as our invention:

1. The process of preparing hydroxyanthraquinones of the formula

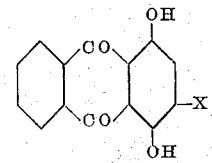

wherein X represents a hydrogen or halogen atom, which comprises diazotizing a p-chloroaniline body of the formula

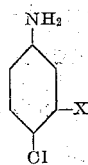

adding the diazo solution to sulphuric acid, incorporating therein a mixture of boric acid and phthalic anhydride without isolation of intermediate reaction products and maintaining the reaction mass at an elevated temperature until condensation and hydrolysis are substantially complete.

2. The process of preparing hydroxyanthraquinones of the formula

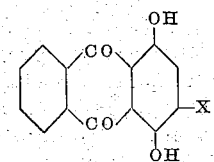

wherein X represents a hydrogen or halogen atom, which comprises reacting upon the diazo compound, formed by diazotizing a p-chloro-aniline of the formula

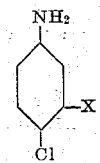

at an elevated temperature with phthalic anhydride in the presence of concentrated sulphuric acid and boric acid and hydrolyzing the resulting product.

3. The process of preparing hydroxyanthraquinones of the formula

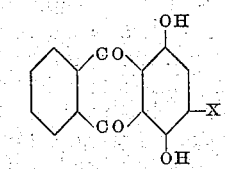

wherein X represents a hydrogen or halogen atom, which comprises reacting upon the diazo compound, formed by diazotizing a p-chloro-aniline of the formula

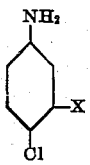

at a temperature of about 200° C. with phthalic anhydride in the presence of practically anhydrous sulphuric acid and boric acid, cooling and diluting in water to precipitate the product.

4. The process of preparing quinizarine, which comprises diazotizing p-chloro-aniline in sulphuric acid, reacting upon the diazo-p-chloro-benzene so formed without isolation thereof and in substantially anhydrous sulphuric acid at about 200° C. with phthalic acid and boric acid, maintaining the reaction mass at that temperature until condensation is substantially complete, cooling and pouring into water to precipitate the quinizarine.

5. The process of preparing hydroxyanthraquinones of the general formula

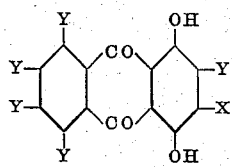

wherein X represents a hydrogen or a halogen atom and Y represents a univalent group such as hydrogen, halogen, or alkyl, which comprises diazotizing a p-chloro-aniline, reacting upon the p-chloro-diazo-benzene body so formed without isolating and in substantially anhydrous sulphuric acid at about 200° C. with a phthalic anhydride body in the presence of boric acid, maintaining that temperature until condensation is substantially complete and diluting the reaction mass to precipitate out the hydroxyanthraquinone body.

6. The process of preparing a dihydroxyanthraquinone, which comprises heating a halogen substituted diazo benzene in the presence of sulphuric acid, boric acid and phthalic anhydride.

7. The process of preparing a 1, 4-dihydroxyanthraquinone, which comprises heating a para chloro substituted diazo benzene in the presence of sulphuric acid, boric acid and phthalic anhydride without the isolation of intermediate bodies.

8. The process of preparing a quinizarine, which comprises diazotizing a p-chloro-aniline in sulphuric acid, reacting upon the diazo-p-chloro-benzene body so formed without isolating and in substantially anhydrous sulphuric acid at about 200° C. with phthalic anhydride in the presence of boric acid, maintaining that temperature until condensation is substantially complete, cooling and diluting in water to precipitate out the quinizarine body.

In testimony whereof, we have hereunto subscribed our names at Carrollville, Milwaukee County, Wisconsin.

IVAN GUBELMANN.
HENRY J. WEILAND.